(12) United States Patent
Marty et al.

(10) Patent No.: US 9,734,405 B2
(45) Date of Patent: Aug. 15, 2017

(54) SYSTEMS AND METHODS FOR MONITORING OBJECTS IN ATHLETIC PLAYING SPACES

(71) Applicants: Alan W. Marty, Menlo Park, CA (US); John Carter, Elkmont, AL (US); Simon Lucey, Pittsburgh, PA (US)

(72) Inventors: Alan W. Marty, Menlo Park, CA (US); John Carter, Elkmont, AL (US); Simon Lucey, Pittsburgh, PA (US)

(73) Assignee: Pillar Vision, Inc., Menlo Park, CA (US)

( * ) Notice: Subject to any disclaimer, the term of this patent is extended or adjusted under 35 U.S.C. 154(b) by 0 days.

(21) Appl. No.: 14/874,555

(22) Filed: Oct. 5, 2015

(65) Prior Publication Data
US 2017/0098125 A1     Apr. 6, 2017

(51) Int. Cl.
*G06K 9/00* (2006.01)
*G06T 7/20* (2017.01)
*G06T 7/50* (2017.01)

(52) U.S. Cl.
CPC ............ *G06K 9/00724* (2013.01); *G06T 7/20* (2013.01); *G06T 7/50* (2017.01);
(Continued)

(58) Field of Classification Search
CPC ... G06T 7/20; G06T 7/50; G06T 2207/10016; G06T 2207/10028; G06T 2207/30224;
(Continued)

(56) References Cited

U.S. PATENT DOCUMENTS 8,267,781 B2   9/2012  Geiss
8,587,659 B1 * 11/2013  Socolinsky ........ H04N 5/23293
                                                      318/47
(Continued)

OTHER PUBLICATIONS

Stein et al., "Accelerometer Localization in the View of a Stationary Camera", Computer and Robot Vision (CRV), 2012 Ninth Conference on.*

(Continued)

*Primary Examiner* — Katrina Fujita
(74) *Attorney, Agent, or Firm* — Maynard Cooper & Gale, P.C.; Jon E. Holland

(57) ABSTRACT

A system uses a camera, a depth sensor, and a processing module to track a moving object in an athletic playing space over time. The processing module receives image frames from the camera and depth data from the depth sensor. The processing module analyzes the depth data to identify which of the pixels are in a plane of a sufficiently large size to indicate that the identified pixels correspond to a playing surface of the athletic playing space. The processing module then determines that gravity is in a direction normal to the identified plane. By finding the direction of gravity within the images, the algorithm for calculating performance parameters based on the trajectory of a moving object within the athletic playing space can be greatly simplified, thereby decreasing the processing burdens associated with calculating the performance parameters and providing more accurate trajectory estimations with fewer measured trajectory points.

41 Claims, 6 Drawing Sheets
(2 of 6 Drawing Sheet(s) Filed in Color)

(52) U.S. Cl.
CPC ............... *G06T 2207/10016* (2013.01); *G06T 2207/10028* (2013.01); *G06T 2207/30224* (2013.01); *G06T 2207/30241* (2013.01)

(58) Field of Classification Search
CPC G06T 2207/30228; G06T 2207/30241; G06K 9/00724
See application file for complete search history.

(56) References Cited

U.S. PATENT DOCUMENTS

| | | | |
|---|---|---|---|
| 8,617,008 B2 | 12/2013 | Marty et al. | |
| 8,622,832 B2 | 1/2014 | Marty et al. | |
| 8,638,367 B1* | 1/2014 | Allen | G06T 19/006 348/157 |
| 8,908,922 B2* | 12/2014 | Marty | G06T 7/2033 382/103 |
| 8,948,457 B2 | 2/2015 | Marty et al. | |
| 8,988,432 B2 | 3/2015 | Mathe et al. | |
| 8,988,556 B1* | 3/2015 | Karakotsios | H04N 5/23229 348/116 |
| 9,582,720 B2* | 2/2017 | Gupta | G06K 9/00664 |
| 2003/0182076 A1* | 9/2003 | Udomkesmalee | G01C 11/06 702/150 |
| 2007/0002039 A1* | 1/2007 | Pendleton | G06T 7/0061 345/419 |
| 2008/0312010 A1* | 12/2008 | Marty | A63B 24/0003 473/447 |
| 2010/0210975 A1* | 8/2010 | Anthony, III | A61B 5/0002 600/595 |
| 2014/0254867 A1* | 9/2014 | Hoof | G06K 9/4604 382/103 |
| 2015/0265897 A1* | 9/2015 | Gordon | A63B 69/0071 473/447 |
| 2016/0061582 A1* | 3/2016 | Lucey | G01B 11/022 348/137 |

OTHER PUBLICATIONS

Ham et al., "Hand Waving Away Scale", ECCV 2014: Computer Vision, 279-293.*
Lobo et al., "Vision and inertial sensor cooperation using gravity as a vertical reference", IEEE Transactions on Pattern Analysis and Machine Intelligence, vol. 25, Iss: Dec. 12, 2003, 1597-1608.*
"Kinect," https://en.wikipeida.org/wiki/Kinect, Oct. 2, 2015.

* cited by examiner

SYSTEMS AND METHODS FOR MONITORING OBJECTS IN ATHLETIC PLAYING SPACES

RELATED ART

In general, it can be desirable to monitor an athlete during a sporting event in order to provide an assessment of the athlete's performance. As an example, systems have been developed that help to train an athlete to perform better or more consistently by measuring a parameter indicative of the athlete's performance and providing feedback indicative of the measured parameter so that the athlete can be informed of how well he or she performed during the sporting event.

Many of these types of systems track the trajectory of an object during free flight within an athletic playing space. As an example, in a basketball training system, the location of a basketball at a plurality of points along a trajectory of the basketball toward a hoop during a basketball shot may be measured and used to calculate various parameters indicative of the quality of the basketball shot or the athlete's performance. As an example, the release angle, release height, maximum shot height, velocity, make/miss status (i.e., whether the ball passes through the hoop), or angle of entry into the hoop may be calculated or otherwise determined and used to provide performance feedback to the shooter. Similarly, other types of objects in free flight, such as golf balls, soccer balls, footballs, baseballs, tennis balls, volleyballs, and hockey pucks, may be tracked in other sports.

In some cases, a depth sensor is used to assist in tracking objects within the athletic playing space. As an example, a camera may be used to capture a series of two-dimensional (2D) images of an object moving within an athletic playing space, and a depth sensor may be used to estimate a depth of the object in each of the captured image frames, thereby permitting the object's location within a three-dimensional (3D) coordinate system to be estimated. Based on the 3D coordinates of the object, its trajectory through the athletic playing space can be estimated permitting the calculation of various performance parameters.

For an object in free flight, gravity has a significant effect on the object's trajectory. Indeed, algorithms for calculating the object's trajectory and associated performance parameters can be greatly simplified if the direction of gravity is known. However, the coordinate systems used by many sensors that employ off-the-shelf depth sensors are not relative to gravity. That is, a device is capable of tracking an object through a 3D space using a depth sensor, but the direction of gravity within the device's coordinate system is unknown.

In order to facilitate the algorithms for calculating trajectory information and performance parameters, the data measured by a conventional depth sensor using a coordinate system in which the direction of gravity is not known can be converted into a format relative to a new coordinate system in which the direction of gravity is known. As an example, a new coordinate system may be defined such that an axis of the coordinate system is parallel with the direction of gravity.

To perform such a conversion, however, the direction of gravity must be determined, and this often is achieved through a calibration process involving manual input. However, such a process can be time consuming and burdensome. In addition, it is possible for the sensor to lose the calibration, such as when it is struck by an object resulting in unpredictable movement of the sensor. In general, it would be desirable for the sensor to be capable of automatically finding the direction of gravity so that a manual calibration process can be avoided. Unfortunately, many conventional calibration processes that could be used to automatically calibrate a sensor's coordinate system relative to gravity are unreliable or imprecise, thereby adversely affecting the quality of measurements based on the calibrated coordinate system. In addition many such calibration processes are processing intensive, thereby limiting the number of times that the calibration can be performed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for monitoring objects in athletic playing spaces. A system in accordance with one embodiment of the present disclosure uses a camera, a depth sensor, and a processing module to track a moving object in an athletic playing space over time. The processing module receives image frames from the camera and depth data from the depth sensor. For each pixel of a given image frame, the depth data provides a corresponding depth value. The processing module analyzes the depth data to identify which of the pixels, within a certain margin of error, are in a plane of a sufficiently large size to indicate that the identified pixels correspond to a playing surface (e.g., surface of a court or field) of the athletic playing space. The processing module then determines that gravity is in a certain direction (e.g., normal) relative to the plane defined by the identified pixels. By finding the direction of gravity within the images, the algorithm for calculating performance parameters based on the trajectory of a moving object within the athletic playing space can be greatly simplified, thereby decreasing the processing burdens associated with calculating the performance parameters and providing more accurate trajectory estimations with fewer measured trajectory points.

Figure 1:
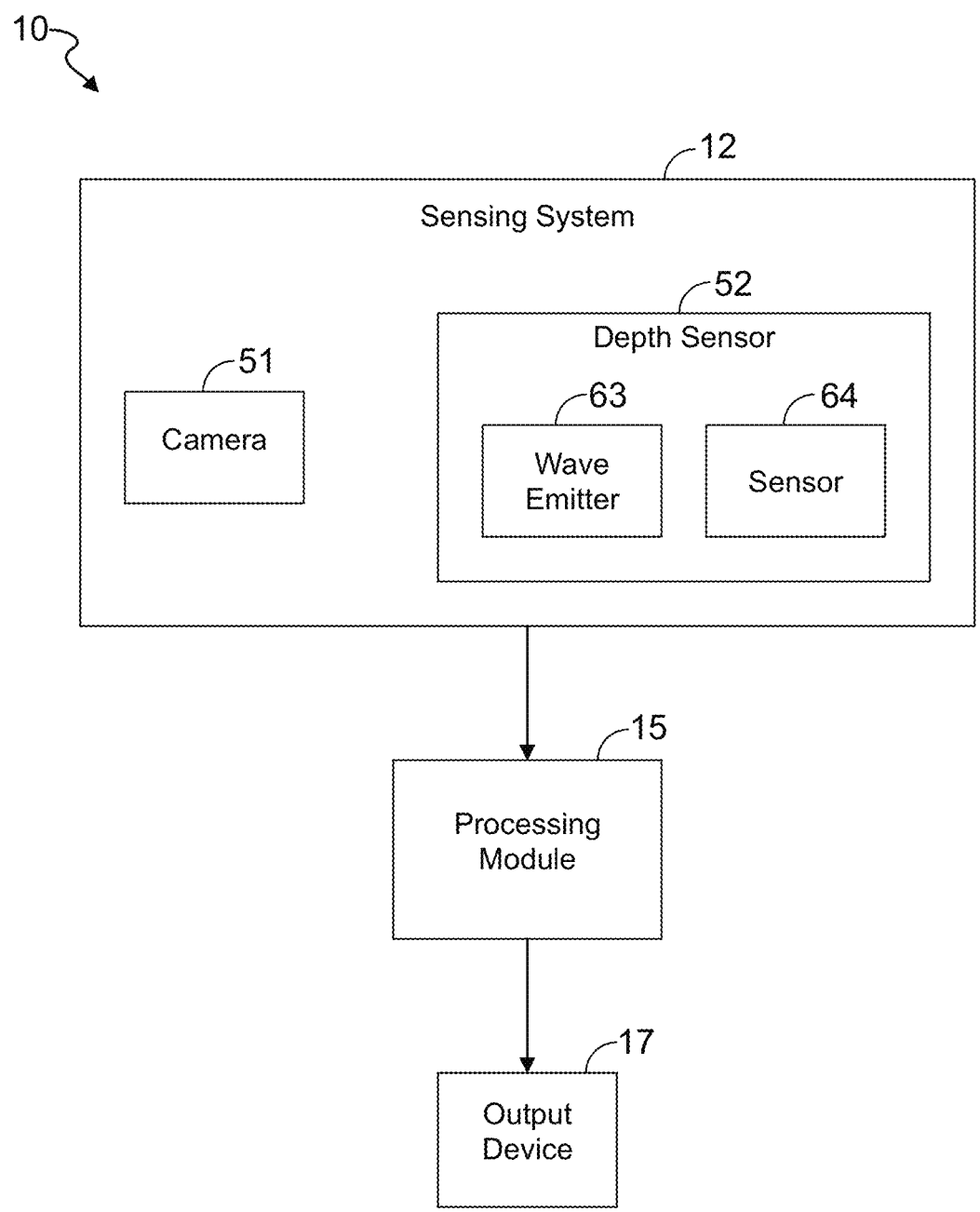
FIG. 1 is a block diagram illustrating an exemplary system for monitoring objects in athletic playing spaces.

FIG. 1 depicts an exemplary system 10 for monitoring objects in athletic playing spaces. For illustrative purposes, the system 10 will be described in detail in the context of monitoring basketball players or basketballs as the players or basketballs are moving within the perimeter of a basketball court. However, the system 10 may be used for other sports, such as football, baseball, hockey, soccer, volleyball, tennis, golf, or any other sport or event in which it is desirable to track moving objects.

As shown by FIG. 1, the system 10 comprises a sensing system 12 that is communicatively coupled to a processing module 15. The sensing system 12 is configured to sense an object, such as a basketball player or basketball, that is moving within the athletic playing space, and to provide data (referred to hereafter as "sensor data") indicative of the locations of the object as it moves. The processing module 15 receives such data and analyzes the data to determine performance parameters indicative of the performance of a player. As an example, the sensing system 12 may sense the locations of the player or a portion of a player's body, and the processing module 15 may analyze the sensor data to determine a velocity, acceleration, or displacement of the player or a portion of the player's body (such as a hand or elbow during a basketball shot). Various performance parameters and techniques for monitoring objects in athletic playing spaces are described by: U.S. Pat. No. 8,622,832, entitled "Trajectory Detection and Feedback System" and issued on Jan. 7, 2014, which is incorporated herein by reference; U.S. Pat. No. 8,617,008, entitled "Training Devices for Trajectory-Based Sports" and issued on Dec. 31, 2013, which is incorporated herein by reference; U.S. patent application Ser. No. 12/127,744, entitled "Stereoscopic Image Capture with Performance Outcome Prediction in Sporting Environments" and filed on May 27, 2008, which is incorporated herein by reference; and U.S. Pat. No. 8,948,457, entitled "True Space Tracking of Axisymmetric Object Flight Using Diameter Measurement" and issued on Feb. 3, 2015, which is incorporated herein by reference.

In one example, the processing module 15 identifies an object in free flight, such as a basketball that is traveling toward a hoop of a basketball goal during a basketball shot, and determines the object's locations in 3D space for a series of image frames. Each such determined location shall be referred to herein as a "measured trajectory point." Based on the measured trajectory points, the processing module 15 determines a trajectory curve representing a path of movement of the object for the purpose of calculating one or more performance parameters. As an example, based on the determined trajectory curve, the processing module 15 may estimate the object's angle of entry into a hoop of the basketball goal by determining the curve's angle relative to a horizontal plane defined by the hoop at a point that is close to the hoop (e.g., within a plane of the hoop). Note that the processing module 15 has a finite number of measured trajectory points depending on various factors, such as the frame rate of the camera 51 and the amount of time that the object is in view of the camera 51, and the processing module 15 may perform a curve fit algorithm or other type of algorithm in the trajectory analysis in order to smooth the trajectory curve. The algorithm for estimating the trajectory of the object can be greatly simplified if the direction of gravity is known. Indeed, if the direction of gravity is known, the processing burden for estimating the trajectory curve can be reduced, and a more accurate trajectory curve can be determined with fewer measured trajectory points.

As shown by FIG. 1, the processing module 15 is communicatively coupled to an output device 17, such as a display device or an audio device (e.g., a speaker), that is controlled by the processing module 15 to provide feedback to the player indicative of the player's performance during a basketball shot or other activity. As an example, the processing module 15 may determine a performance parameter associated with a basketball shot, such as release height, release angle, velocity, acceleration, maximum shot height, location of shooter (e.g., horizontal distance of shooter from hoop when making a shot), make/miss status, or entry angle or velocity of the basketball into a hoop of a basketball goal. Such performance parameter may be communicated to the player via the output device 17.

In one exemplary embodiment, the processing module 15 uses the make/miss status or other information in order to determine various statistics that may be useful for characterizing the shooter's skill level over a plurality of shots. As an example, the processing module 15 may count the total number of shots that a particular shooter takes and also count the total number of shots made. The processing module 15 may then calculate a performance parameter based on both counts. As an example, the processing module 15 may calculate the percentage of shots made by dividing the total number of made shots to the total number of shots taken.

Note that a user sometimes makes a shot without the ball entering the hoop directly. As an example, a ball may strike the hoop and bounce upward before ultimately falling through the hoop for a made basket. Such shots that bounce off of the hoop in an upward direction but ultimately pass through the hoop shall be referred to herein as "non-guaranteed makes." For a non-guaranteed make, it is possible for the basketball to bounce off of the hoop several times before ultimately passing through the hoop. For other shots, sometimes referred to as "swish" shots, the basketball may pass through the hoop without touching the hoop. For yet other shoots, the basketball may contact the hoop as it passes downward through the hoop without bouncing off the hoop in an upward direction. Shots for which the basketball passes through the hoop without bouncing off the hoop in the upward direction shall be referred to herein as "guaranteed makes." Note that guaranteed makes include swish shots for which the basketball does not contact the hoop, as well as shots for which the basketball contacts the hoop on its way down through the hoop without bouncing off the hoop in an upward direction (i.e., away from the floor of the court).

It is believed that the number of guaranteed makes may be a better indicator of skill level than the number of total made shots. In this regard, a player that has a higher percentage of guaranteed makes tends to be a more consistent and better shooter. Moreover, during any given sample period, a lower skill player may appear to be a better shooter than his or her actual skill level due to an inordinate number of non-guaranteed makes, which have less predictable outcomes relative to guaranteed makes. Moreover, the total number of guaranteed makes or a parameter based on the total number of guaranteed makes may constitute one or more of the performance parameters calculated by the processing module 15. As an example, the processing module 15 may calculate the percentage of guaranteed makes by dividing the total number of guaranteed makes counted during a sample period by the total number of shots attempted by the same player during the sample period. In other embodiments, other parameters based on the number of guaranteed makes counted by the processing module 15 are possible.

Note that a performance parameter based on the number or percentage of guaranteed makes may be reported as feedback to a user. In one embodiment, a performance parameter based on the guaranteed makes counted by the processing module 15 is used to determine a skill level for the player. In this regard, as part of the feedback, the processing module 15 may provide a skill level assessment for a particular player. Such skill level assessment may be qualitative or quantitative in nature. As an example, the assessment may have various qualitative levels, such as "poor," "good," "great," and "expert," and the processing module 15 may use the total number of guaranteed makes during a sample period at least as a factor in selecting which level is appropriate for the player. In this regard, a higher percentage of guaranteed makes generally results in the selection of a higher-skill level according to a predefined algorithm for selecting skill level. The skill level assessment may also be quantitative in nature, such as a score from 0 to 100 (or some other range). Generally, the player is assigned a higher score when he or she has a higher percentage of guaranteed makes, noting that the score may also be based on other factors. In any event, the processing module 15 distinguishes between guaranteed makes and non-guaranteed makes and ultimately assigns the player a skill level assessment based at least on the number of guaranteed makes counted for the player during a sample period.

If desired, the processing module 15 may store data indicative of the performance parameters in memory 36 or transmit such data to another device for storage or analysis. Such data may be analyzed at a later time for providing feedback, as described herein, or for other purposes such as for providing information on the play of the game. As an example, the position of the ball may be compared to the position of an object associated with the playing space, such as a goal or a boundary, to determine whether the ball crossed or reached the object. Various other uses of the data processed by the processing module 15 are possible in other embodiments.

In one example for which the system 10 is used in basketball, the processing module 15 is configured to identify a three-point line in the captured images. As known in the art, a three-point line is generally an arc that extends from the baseline of a basketball court to the top of the key and back to the baseline. The processing module 15 also identifies a shooter that is shooting a basketball near the three-point line. For example, by tracking the relative locations of athletes to the basketball, the processing module 15 can determine when one of the athletes shoots the basketball toward a hoop. The processing module 15 is configured to identify the feet of such shooter and to determine whether both of his feet are on a side of the three-point line in a three-point zone (i.e., a zone of the basketball court outside of the area between the three-point line and the baseline) where shots are worth three points. Based on the relative locations of the shooter's feet and the three-point line, the processing module 15 determines a performance parameter indicating whether the shot is a three-point shot. If any portion of his foot is on or inside the three-point line, the processing module 15 determines that the shooter is not taking a three-point shot. Otherwise, the processing module 15 determines that the shooter is taking a three-point shot. In such an embodiment, a referee or other user may utilize feedback indicative of the performance parameter to determine whether to award three points for the basketball shot.

In the context of football, the location of the football may be compared to a boundary line, such as the goal line, in order to determine whether any portion of the football reaches or crosses the goal line. That is, based on the images captured by the sensing system 12, the processing module 15 may automatically determine whether a touchdown is scored. In such an embodiment, a referee or other user may utilize feedback from the system 10 in order to determine whether to award points for the football reaching or crossing the goal line. In other embodiments, yet other decisions may be made based on comparisons of objects to markings on the playing surface 82.

Note that the processing module 15 may be coupled to the sensing system 12 and/or the output device 17 via physical connections (e.g., wires) or wirelessly. In one exemplary embodiment, the sensing system 12 is mounted on a basketball goal, as will be described in more detail hereafter with reference to FIG. 3, and wirelessly transmits sensor data to the processing module 15, and the processing module 15 may comprise a computer system, such as a desktop, laptop, or handheld computer, which may be integral with the output device 17. As an example, a software application on a smartphone or laptop may implement the functionality described herein for the processing module 15, which may be implemented in hardware or any combination of hardware, software, and firmware. A smartphone may have a touch-sensitive display or speaker that is used to implement the output device 17 for providing visual output to the player or other user. In other embodiments, it is unnecessary for the processing module 15 to be integral with the output device 17. As an example, the output device 17 may be implemented via a display screen or an audio device of a smartphone, and the processing module 15 may wirelessly transmit feedback information to the smartphone, which renders the feedback information to a user via the output device 17. In another embodiment, the output device 17 may be a peripheral device connected to the processing module 15. Yet other configurations are possible in other embodiments.

Figure 2:
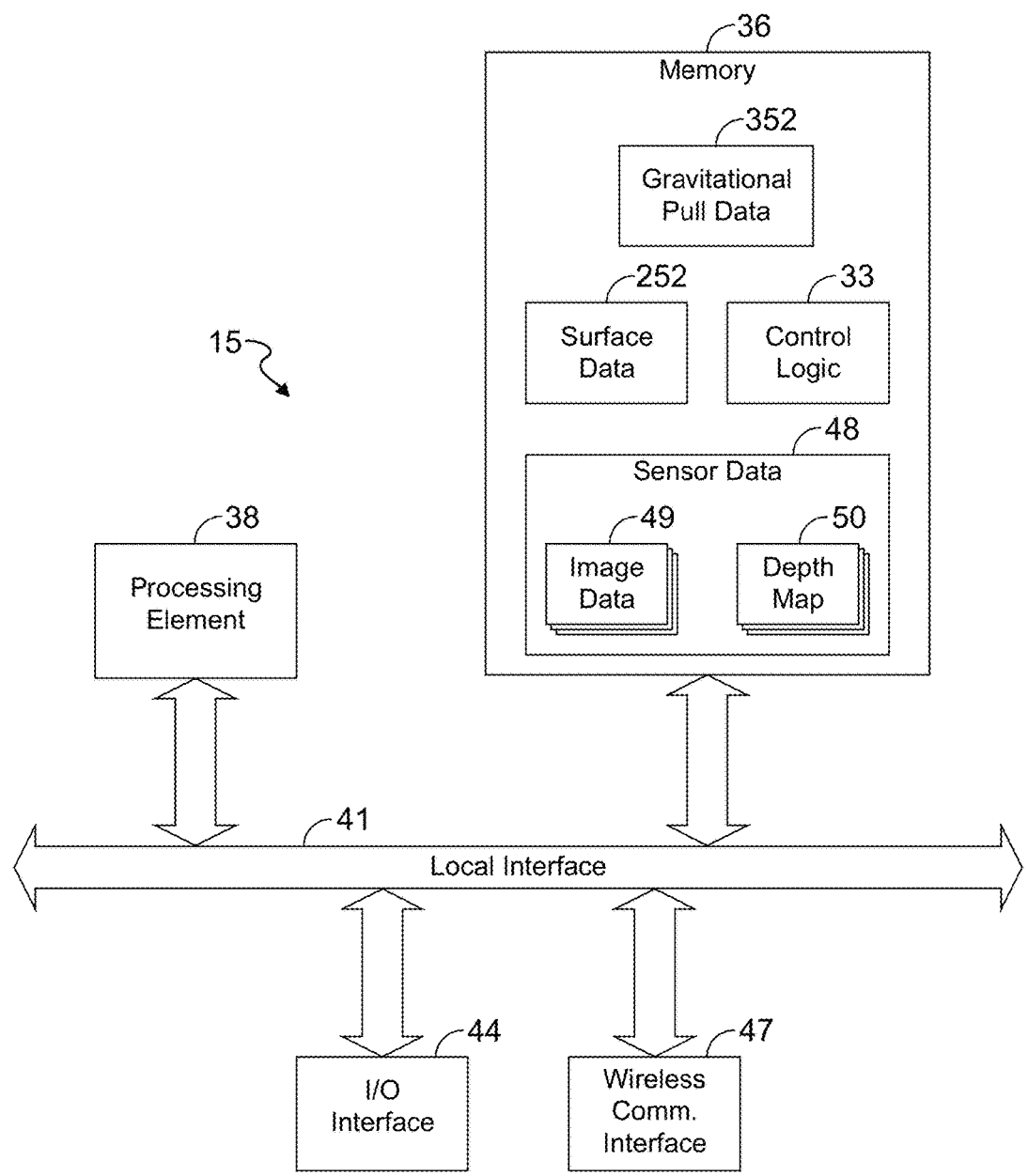
FIG. 2 is a block diagram illustrating an exemplary processing module, such as is depicted by FIG. 1.

FIG. 2 depicts an exemplary embodiment of the processing module 15, which may be implemented by a computer system. In this regard, the processing module 15 comprises control logic 33 for generally controlling the processing module 15, as will be described in more detail hereafter. The control logic 33 can be implemented in software, hardware, firmware or any combination thereof. In the exemplary processing module 15 illustrated by FIG. 2, the control logic 33 is implemented in software and stored in memory 36.

Note that the control logic 33, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary processing module 15 depicted by FIG. 2 comprises at least one conventional processing element 38 such as a digital signal processor (DSP) or a central processing unit (CPU), that communicates to and drives the other elements within the module 15 via a local interface 41, which can include at least one bus. Furthermore, the processing module 15 has an input/output (I/O) interface 44 that may be coupled to devices (not shown) in communication with the module 15. As an example, the sensing system 12 and/or the output device 17 may be coupled to the I/O interface 44 via physical connections. In addition, the processing module 15 comprises a wireless interface 47, such as a radio frequency (RF) or cellular radio or modem, for permitting the processing module 15 to communicate with the sensing system 12 and/or the output device 17 wirelessly.

As shown by FIG. 2, sensor data 48 from the sensing system 12 is stored in memory 36 and is used by the control logic 33 to calculate performance parameters, as will be described in more detail below. In an exemplary embodiment, the sensor data 48 comprises image data 49 from a camera (not shown in FIG. 2) and a depth map 50 from a depth sensor (not shown in FIG. 2), but other types of sensor data 48 may be used in other embodiments.

If desired, the sensing system 12 (FIG. 1) may include any sensor for assisting with the operation and algorithms of the processing module 15. As an example, an accelerometer or other type of motion sensor may be used to provide input regarding movement of the sensing system 12 or a component of the sensing system 12, such as the camera 51. In addition, one or more orientation sensors, such as tilt sensors or gyroscopes, may be used to provide information about the orientation of the sensing system 12 or a component of the sensing system 12, such as the camera 51. Known algorithms may be used by the control logic 33 in order to determine the direction of gravity based on accelerometer readings or other types of readings from motion sensors, orientation sensors, or other types of sensors. As will be described in more detail below, the control logic 33 may determine the direction of gravity based on one or more accelerometers or other types of sensors and use this information to assist with its operation.

Various types of sensing systems 12 may be used to sense the object being monitored. In one exemplary embodiment, as shown by FIG. 1, the sensing system 12 comprises a camera 51 and a depth sensor 52. The camera 51 is configured to capture video images of the playing spacing including images of the object being monitored and to provide image data 49 defining frames of the captured images. In one embodiment, the images are two dimensional, and the depth sensor 52 is used to sense depth or in other words a distance from the sensor 52 to an object in the image. In this regard, for each frame of image data 49, the depth sensor 52 provides a depth map indicating a respective depth for each pixel of the image frame. Note that the depth sensor 52 may be oriented such that the distance measured by the depth sensor 52 is in a direction that is substantially normal to the plane of the 2D coordinate system used by the camera 51, although other orientations of the depth sensor 52 are possible in other embodiments.

Figure 3:
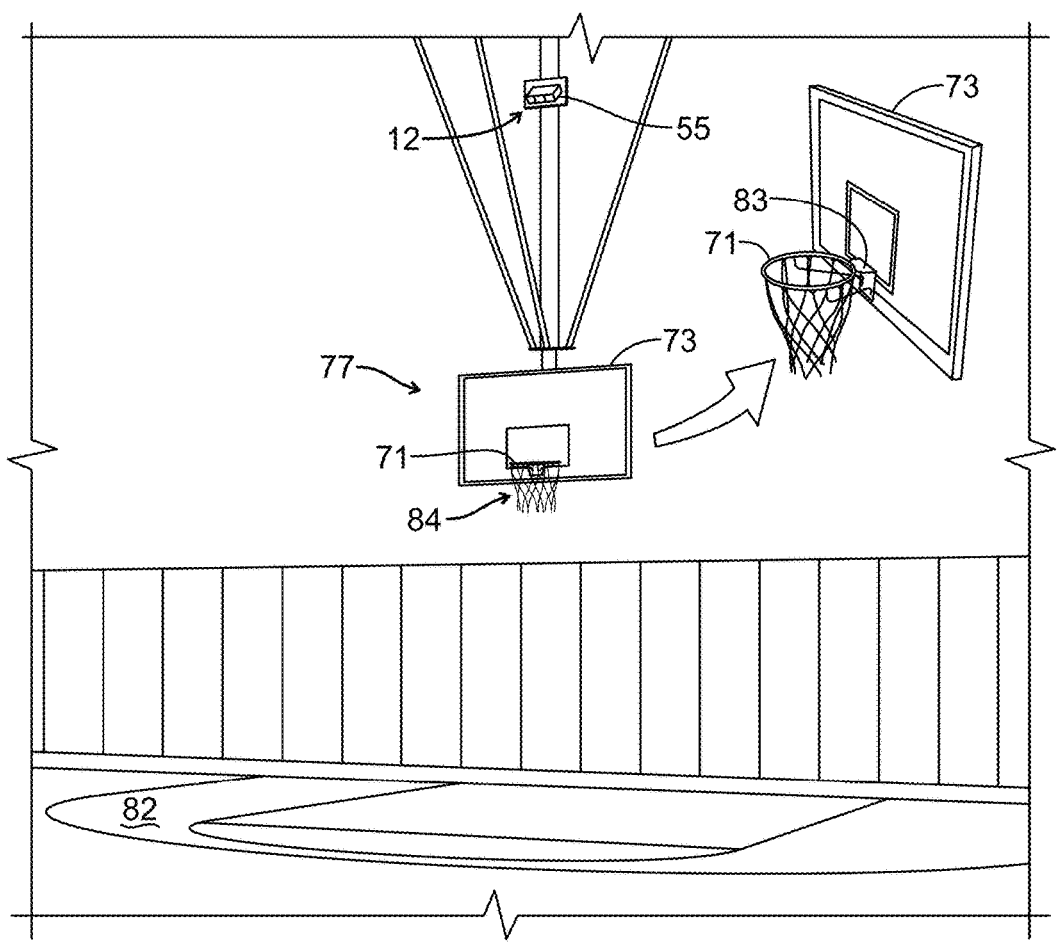
FIG. 3 shows an exemplary sensing system, such as is depicted by FIG. 1, mounted on a pole above a basketball goal.

Various types of cameras 51 and depth sensors 52 may be used to implement the sensing system 12. In one exemplary embodiment, the sensing system 12 is implemented using a KINECT® camera system sold by Microsoft Corporation. In such a system, the camera 51 and depth sensor 52 are integrated into the same housing 55 (FIG. 3). The camera 52 is configured to capture a video stream comprising frames of video data in which each frame is defined by a plurality of pixels. Each pixel is associated with two coordinates, an x-coordinate and a y-coordinate, representing a location in 2D space. For each frame, each pixel is assigned a color value (which may include a red component (R) value, a blue component (B) value, and a green component (G) value) indicative of the color of light received by the camera 52 from the location in 2D space corresponding to the pixel's coordinates. Further, for each pixel, the depth sensor 52 measures the distance from the sensor 52 to the real world object that is at the pixel's corresponding location in 2D space. Such distance (which, as described above, may be in a direction substantially normal to the plane of the 2D coordinate system used by the camera 51) may be referred to as the "depth" of the corresponding pixel. Using the image data from the camera 51 and the depth data from the depth sensor 52, the location of an object captured by the camera 51 can be determined in 3D space. That is, for a point on the object, its x-coordinate and y-coordinate from the image data provided by the camera 51 indicate its location along two axes (e.g., the x-axis and y-axis), and the point's depth value from the depth sensor, which may be referred to as the "z-coordinate," indicates its location along a third axis (e.g., the z-axis). Notably, the coordinate system defined by the three axes is not relative to gravity. That is, depending on the orientation of the system 12, gravity may be in any direction relative to the axes of the coordinate system. Thus, unless a calibration process is performed, the direction of gravity relative to the coordinate system is unknown.

In a Kinect® camera system, the depth sensor 52 comprises a wave emitter 63 (e.g., an infrared laser projector or other type of emitter) and a sensor 64 for sensing reflections of the energy emitted by the emitter 63. The emitter 63 emits infrared radiation at various wavelengths into free space, although radiation at other wavelengths outside of the infrared spectrum (e.g., visible light) may be emitted in other embodiments, and the sensor 64 senses the reflected energy to capture a video stream comprising frames of video data. Each frame of the depth data from the sensor 52 corresponds to a respective frame of image data from the camera 51. Further, a pixel of a frame of the depth data corresponds to (e.g., has the same x- and y-coordinates) and indicates the depth for at least one corresponding pixel in the image data from camera 51.

In this regard, for a frame of video data captured by the depth sensor 52, the depth sensor 52 converts the frame to a depth map 50 by assigning each pixel a new color value (referred to herein as "depth value") representative of the pixel's depth. Thus, when the depth map 50 is displayed, objects displayed as the same color within the image should be approximately the same distance away from the depth sensor 52, noting that it is often unnecessary for the depth map 50 to actually be displayed during operation.

As described above, a given pixel of the image data 49 from the camera 51 is associated with an x-coordinate and y-coordinate indicative of the pixel's location in 2D space, and the pixel is associated with a depth value from a corresponding pixel in the depth map 50 provided by the depth sensor 52 indicative of the pixel's z-coordinate. The combination of the x-coordinate, y-coordinate, and z-coordinate defines the pixel's location in 3D space relative to the coordinate system of the camera 51. That is, the x-coordinate, y-coordinate, and z-coordinate define the location of the point from which light measured for the pixel was reflected toward the camera 51 from an object.

The fact that the direction of gravity is unknown in the coordinate system of the camera 51 is not a drawback in many applications for the sensing system 12. However, when the sensing system 12 is used to estimate the trajectory of an object in free flight, as described herein, knowledge of the direction of gravity relative to the object's position is desirable in order to facilitate the process of estimating the object's trajectory.

In one exemplary embodiment, the control logic 33 is configured to automatically determine the direction of gravity relative to the locations indicated by the sensor data 48 in order to convert the data's coordinate system into a gravity-based coordinate system. As used herein, a "gravity-based" coordinate system is a coordinate system for which there is known relationship between the direction of gravity and the axes of the coordinate system such that the direction of gravity relative to any point indicated by the coordinate system can be determined. As an example, a gravity-based coordinate system may be defined such that the direction of gravity is parallel to an axis (e.g., z-axis) of the coordinate system, though it is possible for other relationships to exist between the direction of gravity and the axes of the coordinate system.

Exemplary techniques for converting the sensor data 48 (e.g., image data 49 and depth maps 50) from a format relative to the coordinate system of the camera 51 into a format relative to a gravity-based coordinate system will be described in more detail below. In one embodiment, the sensing system 12 is positioned such the camera 51 and depth sensor 52 have a broad view of the athletic playing space, including the playing surface (e.g., surface of a field or court) on which the athletic activity is played. For example, in basketball, the sensing system 12 may be mounted such that the camera 51 and depth sensor 52 are positioned above the hoop of a basketball goal with a view of the hoop and the floor of the basketball court. FIG. 3 depicts an exemplary embodiment in which the sensing system 12 is mounted above a hoop 71 and backboard 73 of a basketball goal 77. As an example, the goal 77, including the backboard 73 and hoop 71, may be mounted on one or more poles 79 that extend from a ceiling or wall of a building or other structure, and the sensing system 12, including the camera 51 and depth sensor 52, may be mounted on at least one such pole 79 above the backboard 73. As shown by FIG. 3 the hoop is coupled to the backboard 73 by a bracket 83, and a net 84 may be coupled to and hang from the hoop 71.

Further, the sensing system 12 may be oriented such that the camera 51 and depth sensor 52 have a downward view that includes the hoop 71, as well as at least a portion of the playing surface 82 (which is the floor surface of the basketball court in the current example). When the sensing system 12 is so oriented, the camera 51 and depth sensor 52 capture images of the playing surface 82 and other objects, such as goal 77, within the athletic playing space, as shown by block 202 of FIG. 7.

Figure 4:
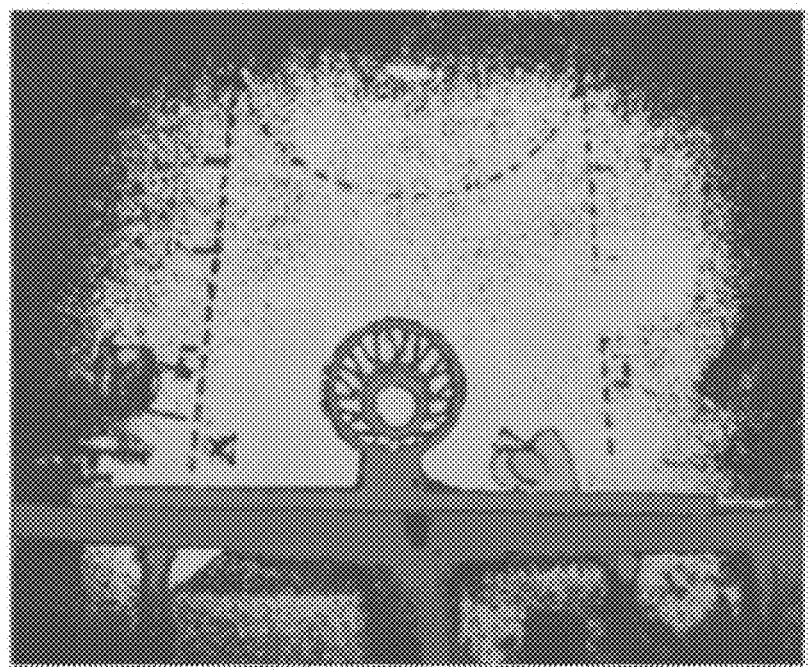
FIG. 4 depicts an exemplary depth map image captured by a depth sensor, such as is depicted by FIG. 1.

FIG. 4 shows an exemplary depth map image that may be captured by the depth sensor 52 in such an embodiment. In the depth map image shown by FIG. 4, the pixels are colored based on depth, as determined by the depth sensor 52. In this regard, the darker that a pixel's color is in the depth map 50, the smaller is the pixel's depth value. Thus, pixels corresponding to objects closer to the depth sensor 52 appear darker in color relative to pixels corresponding to object farther from the depth sensor 52. As an example, because the hoop 71 and backboard 73 are closer to the depth sensor 52 relative to the playing surface 82, pixels defining an image of the hoop 71 and backboard 73 are colored darker than pixels defining an image of the playing surface 82.

Figure 7:
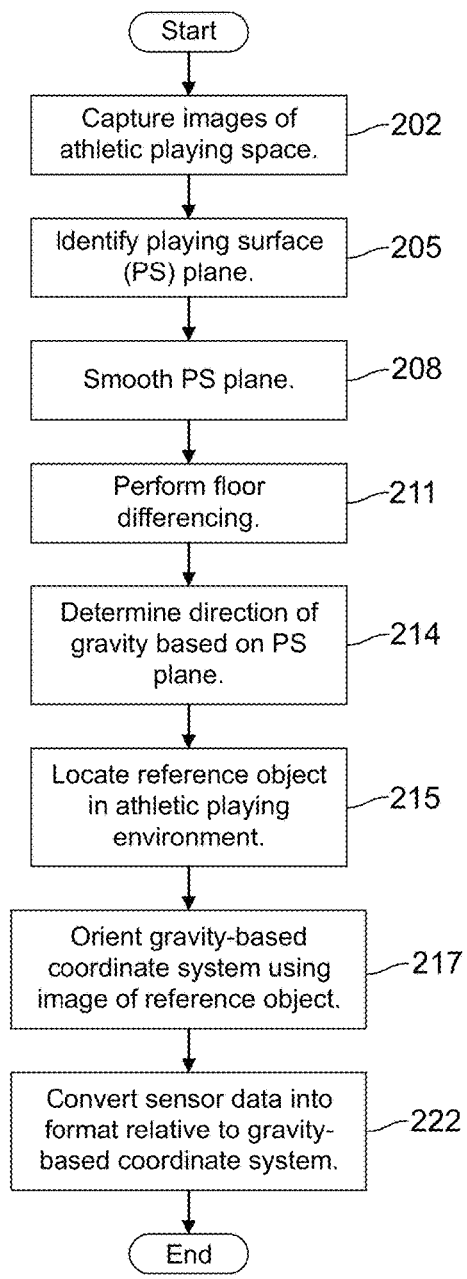
FIG. 7 depicts an exemplary process for calibrating a gravity-based coordinate system.

In one exemplary embodiment, the control logic 33 analyzes the depth map 50 in order to identify a playing surface (PS) plane within the image of the depth map 50, as shown by block 205 of FIG. 7. The PS plane generally refers to a plane that is parallel to the playing surface 82 (e.g., surface of a court or field) on which the athletic activity is played. In this regard, athletic activities are often played in wide, open spaces with relatively flat surfaces, such as fields or courts. Thus, a large number of pixels in the depth map should correspond to the playing surface 82 and, hence, be within the same plane. For example, when the sensing system 12 is mounted high above the playing surface, a significant portion of an image may correspond to the playing surface, and the pixels corresponding of the playing surface may have color values within a relatively narrow color range. Moreover, the control logic 33 is configured to analyze the depth map 50 to identify planes. That is, the control logic 33 is configured to identify at least one set of depth pixels that are within the same plane. When the sensing system 12 is mounted high above the playing surface, planes can be identified by finding groups of contiguous depth pixels having similar color values. However, other techniques may be used in other embodiments. As an example, the surface geometry of an object within view of the camera 51 can be analyzed based on the depth pixels in order to identify depth pixels that are within the same plane. Thus, it is unnecessary for the pixels in the same plane to have the similar depths in order to be in the same plane.

As an example, in a volleyball game, one or more sensing systems 12 may be mounted on one or more sides of the volleyball court such that a sensing system 12 is below the net of the volleyball court. In such an embodiment, the view of the floor of the volleyball court may be closer to a horizontal perspective than a vertical perspective such that depth pixels corresponding to the floor of the volleyball court may have significantly different depth values as the floor extends away from the sensing system 12.

Some objects, such as portions of the goal 77, may have flat surfaces from the perspective of the depth sensor 52, but the size of a flat surface of the goal 77 within the view of the depth sensor 52 is likely to be much smaller than the size of the playing surface 82. For each set of depth pixels defining a plane, the control logic 33 may determine the total number of depth pixels within the plane and compare this number to a threshold. If the number is below the threshold, the control logic 33 may determine that the pixel set does not correspond to the playing surface 82. That is, the size of the plane represented by the pixel set is too small to be representative of the playing surface 82. The pixel set having the greatest number of depth pixels above the threshold within the same plane may be identified by the control logic 33 as the pixel set corresponding to the playing surface 82, referred to hereafter as the "floor planes (FP) pixel set."

Note that various sensors may be used to assist with identification of the FP pixel set defining the PS plane. As an example, as described above, one or more accelerometers or other types of sensors may be used to determine the approximate direction of gravity, and such information may be used to filter the planes identified by the control logic 33 in order to eliminate planes that are not within a predefined range of the direction of gravity, as determined by the foregoing sensors. As an example, only pixel sets defining a plane that is substantially perpendicular to the direction of gravity, as determined by one or more accelerometers or other sensors, may be eligible for selection as the FP pixel set. Once the FP pixel set is identified, it may be used to make a more precise measurement of the direction of gravity according to the techniques described herein.

Due to errors in estimating the pixel depths by the depth sensor 52 or other factors (such as curvature, if any, of the playing surface), the FP pixel set in some cases may not define a perfect plane. The control logic 33 is configured to perform a mathematical smoothing operation on the FP pixel set in order to remove outliers far away from the FP pixel set, as shown by block 208 of FIG. 7. In one exemplary embodiment, Random Sample Concensus is used to implement the mathematical smoothing operation, but other types of smoothing operations may be used in other embodiments.

In addition to the smoothing operation, the control logic 33 also performs an algorithm, referred to herein as "floor differencing," in an effort to remove depth pixels that are out of the PS plane but closer to the PS plane than the outliers removed by the smoothing operation, as shown by block 211 of FIG. 7. In this regard, after performing the smoothing operation, the control logic 33 analyzes the FP pixel set in order to estimate the initial location and orientation of the PS plane, which will be referred to as the "initial PS plane." The control logic 33 then compares each depth pixel of the FP pixel set to the initial PS plane identified by the control logic 33. As an example, the control logic 33 may determine the difference between (1) the depth indicated by the depth pixel and (2) the depth of the point on the initial PS plane that is closest to the depth indicated by the depth pixel. If the difference is greater than a predefined threshold (TH), then the control logic 33 removes the depth pixel from the FP pixel set. Thus, by performing the floor differencing, depth pixels that are associated with locations greater than a threshold distance away from the initial PS plane are removed from the FP pixel set.

After performing floor differencing, the control logic 33 again analyzes the FP pixel set in order to estimate the location and orientation of the PS plane indicated by the modified FP pixel set, thereby identifying the PS plane that is to be used for converting the sensor data 48 into a format relative to the gravity-based coordinate system. In this regard, the control logic 33 may determine that the direction of gravity is perpendicular to this identified PS plane, as shown by block 214 of FIG. 7.

Before the sensor data 48 is converted, the control logic 33 is configured to select an origin for the gravity-based coordinate system and to define three axes: an x-axis, a y-axis, and a z-axis. These axes are perpendicular to each other, and each axis is defined to pass through the origin. In one embodiment, the x-axis and y-axis are defined to be parallel to the identified PS plane, and the z-axis is defined to be perpendicular to the PS plane and, therefore, parallel with the direction of gravity. In other embodiments, other orientations of the axes relative to the direction of gravity and the PS plane are possible.

In order to facilitate calculations of performance parameters, the control logic 33 is configured to define a relationship between the gravity-based coordinate system and the athletic playing environment. As an example, in order to determine the angle of entry of a basketball into a hoop 71, the control logic 33 should be aware of the locations of the basketball relative to the hoop 71 as it is traveling along a trajectory. This may be achieved by determining a relationship between at least one reference point in the gravity-based coordinate system, such as the origin, and at least one reference point in the athletic playing environment. By doing so, the location of any object sensed by sensing system 12, such as a player or basketball, relative to other objects in the playing environments, such as a hoop 71, can be automatically determined.

Note that any point in the playing environment can be used as a reference for the gravity-based coordinate system. As an example, within the image data 49, it is possible to identify a boundary line or other court marking on the floor of a basketball court and use the identified marking to reference the gravity-based coordinate system to the playing environment. However, the types or styles of markings may vary from court-to-court. A basketball hoop 71, on the other hand, generally has a consistent size and shape, thereby facilitating identification of a hoop 71 within the images provided by the sensing system 12.

The control logic 33 is configured to identify a reference object (e.g., a basketball hoop 71) in the images provided by the sensing system 12 and to reference the gravity-based coordinate system based on the identified object, as shown by block 215 of FIG. 7. In one exemplary embodiment, the control logic 33 is configured to locate a basketball hoop 71 in the images and to define the gravity-based coordinate system such that its origin is at the center of such hoop 71. Notably, the plane of the basketball hoop 71 should be parallel to the PS plane identified by the control logic 33. Since the x-axis and y-axis are defined to be parallel to the PS plane, the x-axis and y-axis should be within the plane of the basketball hoop 71 when the origin is positioned at the center of the hoop 71. In addition, when the origin is so defined, the z-axis passes through the center of the hoop 71 in a direction parallel to gravity.

In order to facilitate installation of the sensing system 12, the sensing system 12 may be mounted at any height above the playing surface 82 and the hoop 71. Without knowing the distance of the hoop 71 from the depth sensor 52, the control logic 33 is configured to analyze a depth map 50 from the depth sensor 52 in order to estimate such distance. Before estimating this distance, the control logic 33 first locates the basketball hoop 71 within such image. Exemplary techniques for identifying the hoop 71 will be described in more detail below.

In one exemplary embodiment, the control logic 33 is configured to identify a pixel set, referred to hereafter as the "basketball goal (BG) pixel set," that does not include the pixels corresponding to playing surface 82, thereby removing a significant number of pixels from the BG pixel set. As an example, the control logic 33 may perform an algorithm similar to the floor differencing algorithm described above on all of the depth pixels of a depth map 50. However, rather than removing the depth pixels that are greater than a threshold (TH) distance from the PS plane, the control logic 33 instead removes the depth pixels that are less than the threshold distance from the PS plane and keeps the depth pixels that are more than the threshold distance from the PS plane.

Figure 5:
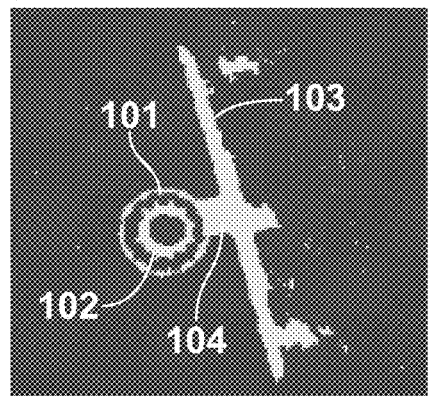
FIG. 5 depicts an exemplary depth map image captured by a depth sensor, such as is depicted by FIG. 1, after depth pixels corresponding to a playing surface plane have been removed.

FIG. 5 shows an exemplary depth map image after floor differencing has been performed in order to remove the depth pixels that correspond to the PS plane. As shown by FIG. 5, the depth map image includes an image 101 of the hoop 71, an image 102 of a net 84 coupled to the hoop 71, an image 103 of the backboard 73 to which the hoop 71 is mounted, and an image 104 of a bracket 83 for coupling the hoop 71 to the backboard 73. From a view above the goal 77, the bracket 83 may appear substantially rectangular, as shown by FIG. 5, although other shapes are possible.

Figure 6:
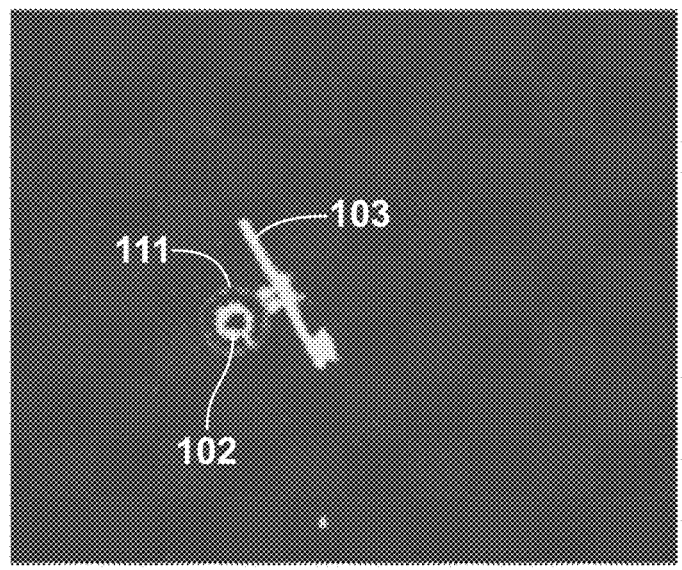
FIG. 6 depicts the exemplary depth map image depicted by FIG. 5 after a hoop template has been superimposed on an image of a hoop.

The control logic 33 searches the depth map image for the image of a circular ring in order to identify the hoop image 101. When the hoop image 101 is found, the control logic 33 determines the size (e.g., diameter) of the hoop image 101. There are various techniques that can be used to determine the size of the hoop image 101. In one exemplary embodiment, the control logic 33 superimposes a scalable hoop template 111 over the hoop image 101, as shown by FIG. 6 (noting that the template 111 is shown in red in FIG. 6). The diameter of the hoop image 111 is adjusted in order to maximize the number of pixels in the hoop image 101 that are covered by the hoop template 111. Since the actual diameter of the hoop 71 is known (about 18 inches for a standard-sized hoop), the distance of the depth sensor 52 from the hoop 71 can be calculated based on the diameter of the template 111.

The hoop diameter in the hoop image 101 may be used by the control logic 33 to calibrate the trajectory calculations to account for the location of the sensing system 12. In this regard, for accurate trajectory calculations, the control logic 33 should be aware of scaling factor to be used to relate distances in an image to the physical distances in the real world. As an example, a distance of half an inch in a captured image may represent a distance of several feet (or some other distance) in the real world. The scaling factor between real-world dimensions and dimensions within the captured images is generally based on several factors, including the location of the sensing system 12 relative to objects appearing in the images, as well as the zoom or magnification of the camera used to capture the image. In one exemplary embodiment, the control logic 33 determines how distances in the captured images correlate or scale with real world distances based on the hoop image 101. In this regard, as described above, the real world diameter of the hoop is typically the same from goal-to-goal (i.e., approximately 18 inches). Thus, based on the diameter of the hoop in the image 101, the control logic 33 can determine the appropriate scaling factor for converting distances in the captured image to real world distances. In other embodiments, other types of objects having known dimensions may be used instead of the hoop. As an example, certain court markings (such as a length of a free throw line) may be known, and images of such court markings may be used to determine the appropriate scaling factor. Also, the distance from the hoop 71 to the playing surface 82 is usually known and can be used as a reference for determining the scaling factor. In other embodiments, yet other types of objects and dimensions may be used to determine the appropriate scaling factor.

In addition, the control logic 33 is also configured to orient the gravity-based coordinate system based on an image of the sensor data 48, as shown by block 217 of FIG. 7. To achieve this in one embodiment, the control logic 33 is configured to identify the image of the bracket 83 in the BG pixel set. As shown by FIG. 5, the region around the hoop image 101 should be substantially devoid of depth pixels as result of the floor differencing described above except for the region where the bracket image 104 is located. Thus, a process for finding the bracket image 104 should be relatively simple and reliable even for brackets 83 of different shapes and configurations. After identifying the bracket image 104, the control logic 33 is configured to orient the axes of the gravity-based coordinate system based on the position of the bracket image 104 relative to the hoop image 101. As an example, the control logic 33 may define one of the axes (e.g., the x-axis) such that it passes through the center of the hoop 71 and the center of the bracket 83.

After orienting the gravity-based coordinate system, the control logic 33 is configured to convert the image data 49 and the depth maps 50 from a format relative to the coordinate system of the camera 51 to a format relative to the gravity-based coordinate system, as shown by block 222 of FIG. 7. Thus, the pixel coordinates for the image data are converted to be relative to the origin of the gravity-based coordinate system rather than the origin of the camera's coordinate system. It should be noted that various changes and modification to FIG. 7 would be apparent to a person of ordinary skill upon reading this disclosure. Moreover, any of the steps of FIG. 7 can be omitted and/or the order of any of the steps may be rearranged as may be desired.

Since the distance of the sensing system 12 from the origin of the gravity-based system is known, the location of any object in the image data 49 relative to the hoop 71 or other object in the playing environment can be calculated. As an example, the trajectory of a basketball can be compared to the location of the hoop 71 in order to determine an angle of entry of the basketball into the hoop. In another example, by knowing the location of the hoop 71 relative to the sensing system 12, the location of a particular court marking within an image, such as a free throw line, can be determined since the marking of a standard basketball court should be a predefined distance and direction from the hoop 71. Thus, it is possible to determine the location of an object relative to the location of the free throw line. For example, the control logic 33 may determine that a player is shooting a free throw based on the player's position, as determined from the image data, relative to the free throw line when he or she launches a basketball toward the hoop 71.

It should be noted that the exemplary processes described above for calibrating the gravity-based coordinate system and converting sensor data 48 into a format relative to the gravity-based coordinate system can be automatically and efficiently performed without any human intervention and without significant processing burdens relative to other techniques that may exist for calibrating coordinate systems. Thus, the process can be repeated as often as may be desired during operation. For example, if the sensing system 12 is struck by a basketball causing the camera 51 and sensor 52 to move, the gravity-based coordinate system can be automatically and quickly re-calibrated according to the techniques described herein.

In addition, in several examples described above, it is assumed that the direction of gravity is perpendicular to the PS plane identified by the control logic 33. However, other directions of gravity relative to the identified PS plane are possible. As an example, certain playing surfaces may be sloped for various reasons, such as for facilitating drainage of water from the surface. For example, a football field often has a "crown" in the middle of the field, and the field slopes downward away from the crown as the sidelines are approached. Thus, portions of the field close to the sideline may be sloped such that the direction of gravity is oblique relative to the surface of the field in the sloped regions. In some cases, the slope of the surface may increase closer to the sideline.

In one exemplary embodiment, the control logic 33 is configured to account for the sloped surface when determining the direction of gravity. Note that there are various techniques that can be used to account for the slope of the surface. As an example, the processing module 15 may store data, referred to herein as "surface data 252" (FIG. 2), indicative of the slope of the playing surface at one or more points. As an example, for each of a plurality of locations on the playing surface, the surface data 252 may have a value indicating a degree to which the surface is sloped, such as a value indicating an angle of the direction of gravity relative to the playing surface at such location. Such data may be predefined and stored in memory 36 prior to normal operation of the processing module 15. As an example, at least one image of the playing surface may be captured with a camera 51 and the depth sensor 52 during a calibration process, and the images may be analyzed by the control logic 33 or otherwise to determine the slope of the playing surface at various locations. In this regard, as described above, depth pixels of depth maps 50 from the depth sensor 52 may be correlated with pixels of image data 49 from the camera 51, and the depths indicated by the depth pixels may be used to calculate the slope of the playing surface at various locations in the images captured by the camera 51. That is, the playing surface is effectively mapped by the control logic 33 in a calibration process so that the slope of the playing surface (relative to gravity) at various locations is indicated by the data 252. In this calibration process, the direction of gravity may be determined based on manual input (e.g., a user may provide an input indicating a direction of gravity within an image) or by finding within an image an object of known orientation, as described above for the basketball hoop. In other embodiments, the sensing system 12 may have sensors, such as accelerometers or other types of sensors, that can be used to sense the direction of gravity, as described above.

Figure 8:
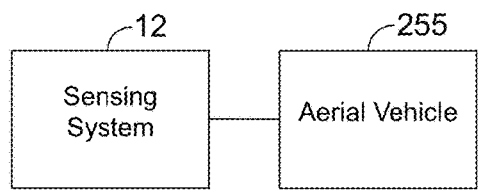
FIG. 8 depicts a sensing system, such as is depicted by FIG. 1, coupled to an aerial vehicle, such as a drone or other aircraft.

In one exemplary embodiment, the sensing system 12 is coupled to an aerial vehicle 255, as shown by FIG. 8, in order to perform the calibration process described above in which the playing surface is mapped to determine its surface topology. The aerial vehicle 255 may comprise a drone or other type of aircraft that flies above the playing surface allowing the camera 51 and depth sensor 52 to capture images of the playing surface as the vehicle 255 flies. If desired, the vehicle 255 may be coupled to a tether that holds the vehicle 255 in the air and/or guides the vehicle 255 as it moves. In other embodiments, the vehicle 255 may be untethered so that it can freely fly under the direction of a pilot or remote control. In such embodiments, the camera 51 captures images of the playing surface 82 from a location above the playing surface 82, and the depth sensor 52 measures the depth or distance to the playing surface. Each pixel of the images captured by the camera 51 is associated with a depth value indicative of the distance from the surface point represented by the pixel to the sensing system 12. Based on such depth values, the slope of the surface at various locations can be calculated and stored in the surface data 252 for later use in determining the direction of gravity, as described above.

During operation after the calibration process described above, the control logic 33 may be configured to determine a location of the playing surface that is within the image before making a decision regarding the direction of gravity. As an example, for a given depth map 50, the control logic 33 may analyze a corresponding set of image data 49 to determine a relative location of the playing surface within the image defined by this set of image data 49. As an example, based on boundary markings (e.g., sidelines on a football field) within the image, the control logic 33 may determine that a location of the playing surface within the image is close to a sideline where the playing surface is significantly sloped. Based on the surface data 252, the control logic 33 determines the extent of the surface slope at such location and calculates or otherwise determines the direction of gravity based on the slope. Specifically, the control logic 33 accounts for the slope by assigning, based on the surface data 252, a direction of gravity that is at an oblique angle relative to the playing surface at the identified location. Thus, the direction of gravity determined by the logic 33 should be accurate even though the image used by the control logic 33 is of a sloped region of the playing surface.

Note that the sensing system 12 coupled to the aerial vehicle 255 may be used in the manner described above in order to monitor athletes on the playing surface according to the techniques described above. The algorithms described above for determining the direction of gravity based images captured by the camera 51 and the depth sensor 52 may be particularly useful for such an embodiment. In this regard, as the vehicle 255 is flying, the orientation of the sensing system 12 relative to gravity is likely to change frequently and abruptly. The algorithms for determining the direction of gravity based on the camera 51 and depth sensor 52 may be repetitively and frequently performed (such as multiple times per second) while consuming a relatively low amount of processing resources yet providing very accurate estimations of the direction of gravity. Such characteristics may be beneficial in a variety of other applications.

In calculating the trajectory of a moving object, it can generally be assumed that the force exerted on such object by gravity is constant. However, the magnitude of such force generally changes with altitude. As an example, the magnitude of gravitational pull is slightly different for an event occurring in a mountainous region relative to an event occurring close to sea level. In one exemplary embodiment, the processing module 15 is configured to account for variations in altitude in performing the trajectory calculations.

In this regard, the processing module 15 is configured to store gravitational pull data 352 (FIG. 2) indicative of the magnitude of gravitational pull for various altitudes. In addition, during operation, the control logic 33 is configured to determine the approximate altitude of the event being monitored by the processing module 15. As an example, a user may simply enter the altitude of the event via an input device (not shown), such as a keyboard, keypad, or mouse, of the processing module 15, or the processing module 15 may receive such information wirelessly via the wireless communication interface 47. Alternatively, the sensing system 12 may have a sensor (not shown), such as an altimeter or a location sensor (e.g., GPS sensor), that can be used to automatically determine the approximate altitude of at least a component of the system 10 and, therefore, the event at which the system 10 is located. In other embodiments, other techniques for determining altitude are possible.

After determining the altitude, the control logic 33 is configured to consult the gravitational pull data 352 in order to determine the magnitude of gravitational pull to be used for trajectory calculations. As an example, the data 352 may be implemented as a table of altitude values and gravitational pull values, and the control logic 33 may use the altitude value received from the sensing system 12 or otherwise obtained by the control logic 33 as a key for looking up the appropriate gravitational pull value to be used for trajectory calculations. In other embodiments, the control logic 33 may be configured to algorithmically calculate the appropriate gravitational pull value based on the determined altitude. Yet other techniques for determining a suitable gravitational pull value for use in trajectory calculations are possible in other embodiments. By determining the gravitational pull value based the actual altitude of the event being monitored, more accurate trajectory calculations are possible, thereby improving the performance of the system 10.

Various embodiments of a monitoring system 10 are described above in the context of basketball. It should be emphasized that similar techniques may be used in other sports for defining a gravity-based coordinate system and converting sensor data into a format relative to the gravity-based coordinate system. As an example, for football, a sensing system 12 may be positioned such that a goalpost and a surface of a football field are within view. Using techniques similar to those described above for basketball, a surface plane corresponding to the surface of the football field may identified and used to determine the direction of gravity. Further, the shape of the goalpost may be used to orient the gravity-based coordinate system relative to the boundaries and markings of the football field. A goal in hockey may be similarly used to orient a gravity-based coordinate system. Similar techniques may be used in yet other sports to define and orient a gravity-based coordinate system.

In addition, the techniques described herein may be useful to monitor objects that are not necessarily in free flight. For example, gravity has a significant event on balls rolling along a sloped surface, such as a golf ball rolling along a contoured green. The techniques described herein for defining a gravity-based coordinate system and tracking the trajectory of objects may be useful in such applications.

Now, therefore, the following is claimed:

1. A system for monitoring objects in athletic playing spaces, comprising:
a camera positioned to capture images of an object in an athletic playing space, wherein the camera is configured to provide image data defining frames of the captured images, and wherein the image data is in a format relative to a first coordinate system;
a depth sensor positioned to sense depths for objects in the athletic playing space, wherein for one of the frames the depth sensor is configured to provide a depth map having a plurality of depth pixels corresponding with a plurality of Image pixels of the one frame, and wherein each of the depth pixels indicates a sensed depth for at least one corresponding image pixel of the one frame; and
at least one processor configured to identify a playing surface plane defined by the depth pixels and to determine a direction of gravity in the one frame based on the identified playing surface plane, the at least one processor further configured to calculate at least one performance parameter based on the image data and the determined direction of gravity, wherein the playing surface plane corresponds to a playing surface of the athletic playing space in which athletes participate during a sporting event.

2. The system of claim 1, wherein the camera and depth sensor are mounted on an arm for supporting a basketball goal.

3. The system of claim 1, wherein the camera and the depth sensor are coupled to an aerial vehicle.

4. The system of claim 1, wherein the playing surface is a floor of a basketball court.

5. The system of claim 1, further comprising an accelerometer, wherein the at least one processor is configured to determine the direction of gravity based on the accelerometer and the identified playing surface plane.

6. The system of claim 1, wherein the at least one processor Is configured to determine an altitude of the athletic playing space and to determine a magnitude of gravitational pull based on the altitude, and wherein the at least one processor is configured to calculate the at least one performance parameter based on the determined magnitude.

7. The system of claim 1, further comprising an output device communicatively coupled to the at least one processor, the output device configured to provide an output based on the performance parameter.

8. The system of claim 7, wherein the output device is configured to communicate with the at least one processor wirelessly.

9. The system of claim 7, wherein the output device is configured to display the performance parameter.

10. The system of claim 1, wherein the at least one processor is configured to convert the image data into a format relative to a gravity-based coordinate system based on the determined direction of gravity.

11. The system of claim 10, wherein the at least one processor is configured to identify an image of a hoop in the depth map and to orient the gravity-based coordinate system based on the identified hoop.

12. The system of claim 11, wherein the at least one processor is configured to determine a distance from the depth sensor to the hoop based on a size of the image of the hoop in the depth map.

13. The system of claim 1, wherein the at least one processor is configured to track a trajectory of a basketball during a shot of the basketball toward a basketball goal.

14. The system of claim 13, wherein the at least one processor is configured to determine locations of the basketball in three-dimensional space at a plurality of points along the trajectory based on the image data and depth data from the depth sensor, and wherein the at least one processor Is configured to define a trajectory curve for the basketball based on the determined locations and the determined direction of gravity.

15. The system of claim 1, wherein the at least one processor is configured to account for a slope of the playing surface for determining the direction of gravity such that the determined direction of gravity is at an oblique angle relative to the playing surface plane.

16. The system of claim 15, wherein the at least one processor is configured to store surface data indicative of a surface topology of the playing surface, and wherein the at least one processor is configured to determine the direction of gravity based on the surface data.

17. The system of claim 1, wherein the at least one processor is configured to determine the direction of gravity based on an angle of gravity relative to the identified playing surface plane.

18. The system of claim 17, wherein the at least one processor is configured to determine the angle based on a slope of the identified playing surface plane.

19. The system of claim 18, wherein the at least one processor is configured to store surface data indicative of the slope, and wherein the at least one processor is configured to determine the angle based on the surface data.

20. A method for monitoring objects in athletic playing spaces, comprising:
capturing images of an object in an athletic playing space with a camera, thereby defining frames of image data, wherein the image data is in a format relative to a first coordinate system;
sensing depths for objects in the athletic playing space with a depth sensor,
providing from the depth sensor a depth map for at least one of the frames, wherein the depth map has a plurality of depth pixels corresponding with a plurality of image pixels of the one frame, and wherein each of the depth pixels indicates a sensed depth for at least one corresponding image pixel of the one frame;
identifying a playing surface plane defined by the depth pixels with at least one processor, wherein the playing surface plane corresponds to a playing surface on which athletes participate in a sporting event occurring in the athletic playing space;
analyzing the playing surface plane defined by the depth pixels with the at least one processor;
determining a direction of gravity for the one frame with the at least one processor based on the analyzing; and
calculating, with the at least one processor, at least one performance parameter based on the image data and the determined direction of gravity.

21. The method of claim 20, wherein the playing surface is a floor of a basketball court.

22. The method of claim 20, further comprising displaying an output with an output device based on the performance parameter.

23. The method of claim 20, wherein the determining the direction of gravity is based on an accelerometer and the identified playing surface plane.

24. The method of claim 20, further comprising;
determining an altitude of the athletic playing space; and
determining a magnitude of gravitational pull based on the determined altitude, wherein the calculating is based on the determined magnitude.

25. The method of claim 20, further comprising converting, with the at least one processor, the image data into a format relative to a gravity-based coordinate system based on the determined direction of gravity.

26. The method of claim 25, further comprising:
identifying, with the at least one processor, an image of a hoop in the depth map; and
orienting the gravity-based coordinate system based on the identified hoop.

27. The method of claim 26, further comprising determining a distance from the depth sensor to the hoop based on a size of the image of the hoop In the depth map.

28. The method of claim 20, further comprising tracking, with the at least one processor, a trajectory of a basketball during a shot of the basketball toward a basketball goal.

29. The method of claim 28, further comprising:
determining, with the at least one processor, locations of the basketball in three-dimensional space at a plurality of points along the trajectory based on the image data and depth data from the depth sensor; and
defining, with the at least one processor, a trajectory curve for the basketball based on the determined locations and the determine direction of gravity.

30. The method of claim 20, further comprising accounting for a slope of the playing surface with the at least one processor such that the determined direction of gravity is at an oblique angle relative to the playing surface plane.

31. The method of claim 20, further comprising storing in memory surface data indicative of a surface topology of the playing surface, wherein the determining the direction of gravity is based on the surface data.

32. The method of claim 20, wherein the determining comprises determining that the direction of gravity is at a predefined angle relative to the playing surface plane defined by the depth pixels.

33. A system for monitoring objects in athletic playing spaces, comprising:
a camera positioned to capture images of an object in an athletic playing space, wherein the camera is configured to provide image data defining frames of the captured images, and wherein the image data is in a format relative to a first coordinate system;
a depth sensor positioned to sense depths for objects in the athletic playing space, wherein for one of the frames the depth sensor is configured to provide a depth map having a plurality of depth pixels corresponding with a plurality of image pixels of the one frame, and wherein each of the depth pixels indicates a sensed depth for at least one corresponding image pixel of the one frame; and
at least one processor configured to identify a playing surface plane defined by the depth pixels and to analyze the playing surface plane defined by the depth pixels for determining a direction of gravity for the one frame, the at least one processor further configured to calculate at least one performance parameter based on the image data and the determined direction of gravity, wherein the playing surface plane corresponds to a playing surface of the athletic playing space in which athletes participate during a sporting event.

34. The system of claim 33, wherein the at least one processor is configured to determine that the direction of gravity is at a predefined angle relative to the playing surface plane defined by the depth pixels.

35. The system of claim 33, wherein the playing surface is a floor of a basketball court.

36. The system of claim 33, further comprising an output device communicatively coupled to the at least one processor, the output device configured to provide an output based on the performance parameter.

37. The system of claim 33, wherein the at least one processor is configured to convert the image data into a format relative to a gravity-based coordinate system based on the determined direction of gravity.

38. The system of claim 37, wherein the at least one processor is configured to identify an image of a hoop in the depth map and to orient the gravity-based coordinate system based on the identified hoop.

39. The system of claim 38, wherein the at least one processor is configured to determine a distance from the depth sensor to the hoop based on a size of the image of the hoop in the depth map.

40. The system of claim 33, wherein the at least one processor is configured to track a trajectory of a basketball during a shot of the basketball toward a basketball goal.

41. The system of claim 40, wherein the at least one processor is configured to determine locations of the basketball in three-dimensional space at a plurality of points along the trajectory based on the image data and depth data from the depth sensor, and wherein the at least one processor is configured to define a trajectory curve for the basketball based on the determined locations and the determined direction of gravity.

* * * * *

UNITED STATES PATENT AND TRADEMARK OFFICE
CERTIFICATE OF CORRECTION

PATENT NO.          : 9,734,405 B2
APPLICATION NO.     : 14/874555
DATED               : August 15, 2017
INVENTOR(S)         : Alan W. Marty, John Carter and Simon Lucey Page 1 of 1

It is certified that error appears in the above-identified patent and that said Letters Patent is hereby corrected as shown below:

In the Claims

Column 17, Claim 1, Line 19, Change "of Image pixels" to --of image pixels--

Signed and Sealed this
Seventh Day of August, 2018

Andrei Iancu
*Director of the United States Patent and Trademark Office*